(12) United States Patent  (10) Patent No.: US 8,761,573 B2
Kishikawa et al.  (45) Date of Patent: Jun. 24, 2014

(54) RECORDING DEVICE, IMAGING AND RECORDING DEVICE, RECORDING METHOD, AND PROGRAM

(75) Inventors: Masashi Kishikawa, Kanagawa (JP); Masayuki Tamura, Kanagawa (JP); Tsutomu Shimosato, Kanagawa (JP); Hisao Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 13/237,093

(22) Filed: Sep. 20, 2011

(65) Prior Publication Data

US 2012/0082425 A1    Apr. 5, 2012

(30) Foreign Application Priority Data

Oct. 1, 2010  (JP) ................................ P2010-224216

(51) Int. Cl.
 *H04N 9/80* (2006.01)
(52) U.S. Cl.
 USPC ............................................................. 386/239
(58) Field of Classification Search
 USPC ................... 386/239, 247, 248, 326, 337
 See application file for complete search history.

(56) References Cited

U.S. PATENT DOCUMENTS

| | | | |
|---|---|---|---|
| 7,099,559 B1 | 8/2006 | Niikawa et al. | |
| 7,565,064 B2 * | 7/2009 | Adolph et al. | ................. 386/239 |
| 7,653,647 B2 | 1/2010 | Borthakur et al. | |
| 2002/0141739 A1 * | 10/2002 | Takahashi | ...................... 386/111 |
| 2004/0022526 A1 * | 2/2004 | Kuno et al. | ..................... 386/125 |
| 2006/0153031 A1 * | 7/2006 | Hirasawa | .................... 369/47.13 |
| 2006/0198607 A1 * | 9/2006 | Ju | ..................................... 386/95 |
| 2009/0171715 A1 | 7/2009 | Conley et al. | |
| 2009/0226149 A1 | 9/2009 | Shibata et al. | |

FOREIGN PATENT DOCUMENTS

| | | |
|---|---|---|
| JP | 2007-515002 | 6/2007 |
| JP | 2008-35394 | 2/2008 |
| WO | WO 2010/967346 | 6/2010 |

OTHER PUBLICATIONS

Search Report issued in corresponding European application No. 11179753.6 dated Mar. 20, 2014.

* cited by examiner

*Primary Examiner* — Tat Chio
(74) *Attorney, Agent, or Firm* — Frommer Lawrence & Haug LLP; William S. Frommer

(57) ABSTRACT

A recording device includes: an input portion to which data to be recorded is input; and a recording control portion which transfers the data input to the input portion to a recording medium to record the data in the recording medium by using a certain file system, and specifies a partial region or some files in the data recorded in the recording medium to set the partial region or the files as recording information of an additional information region prepared in the file system.

9 Claims, 16 Drawing Sheets

EXAMPLE OF INTERNAL CONFIGURATION OF IMAGING DEVICE

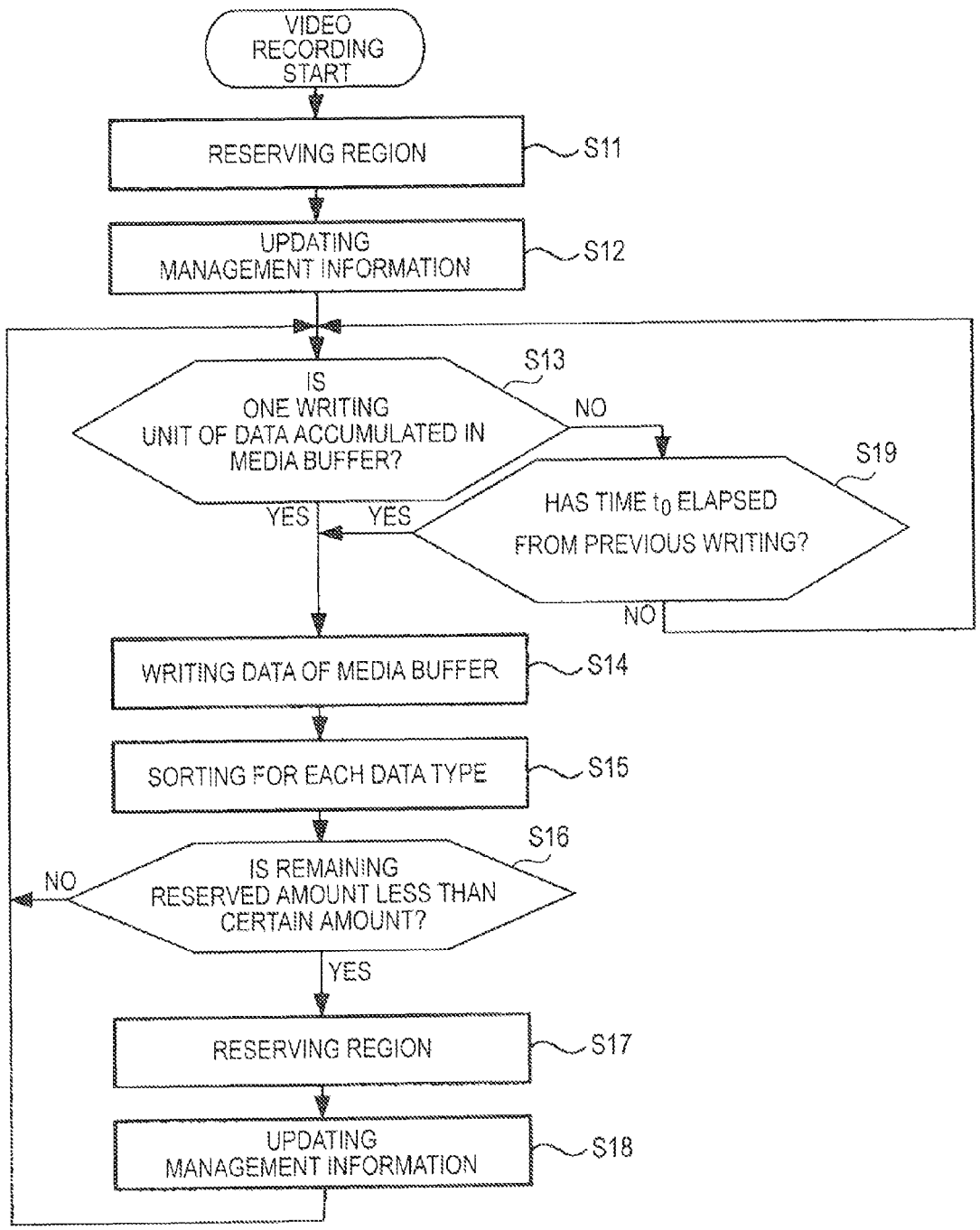

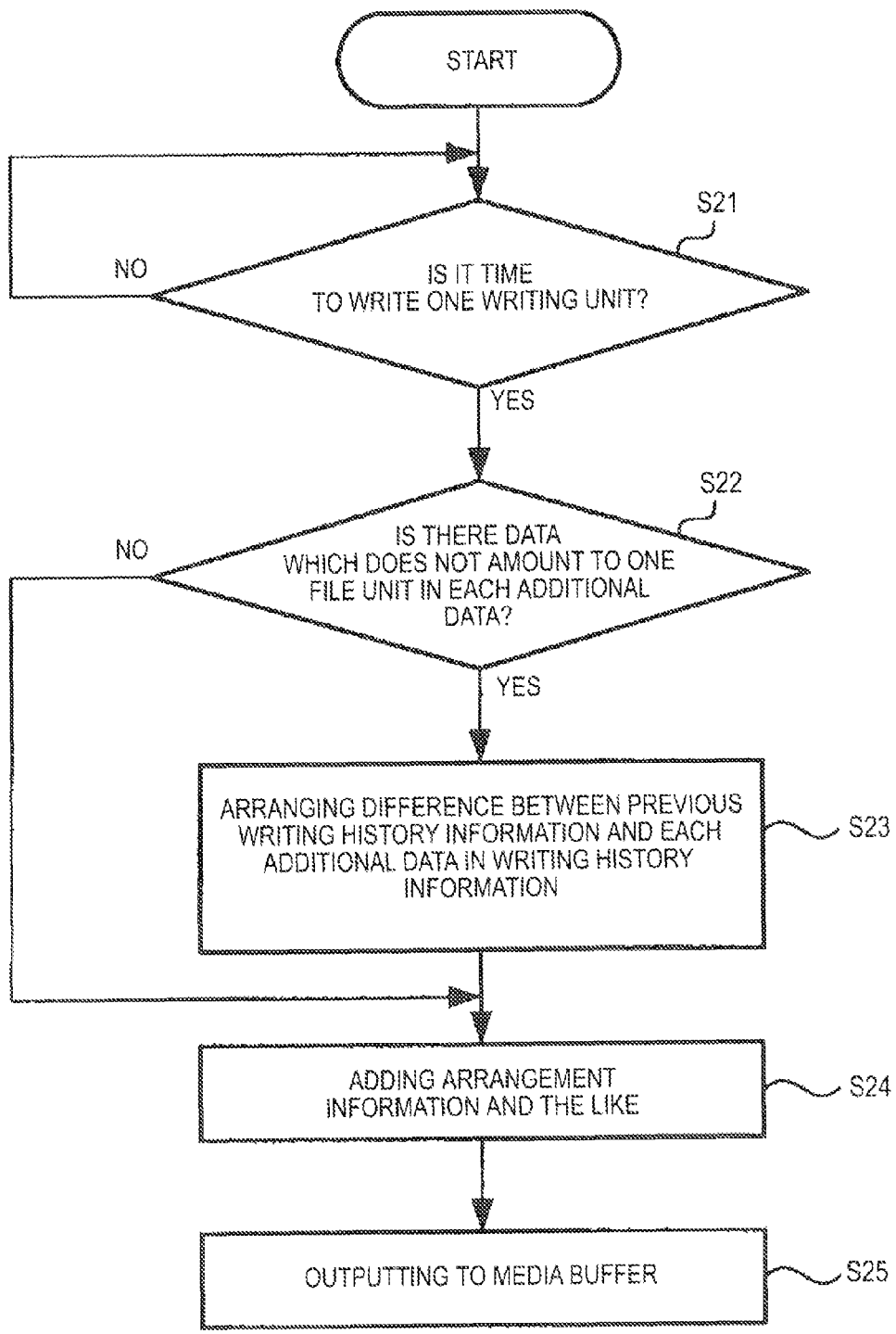

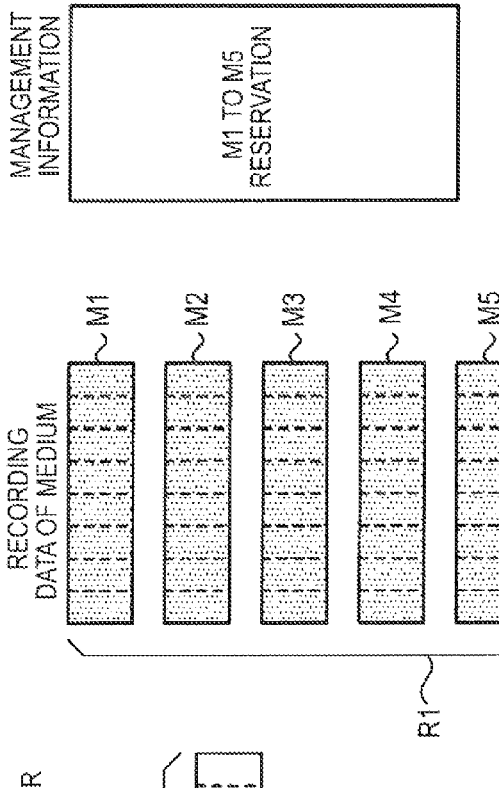
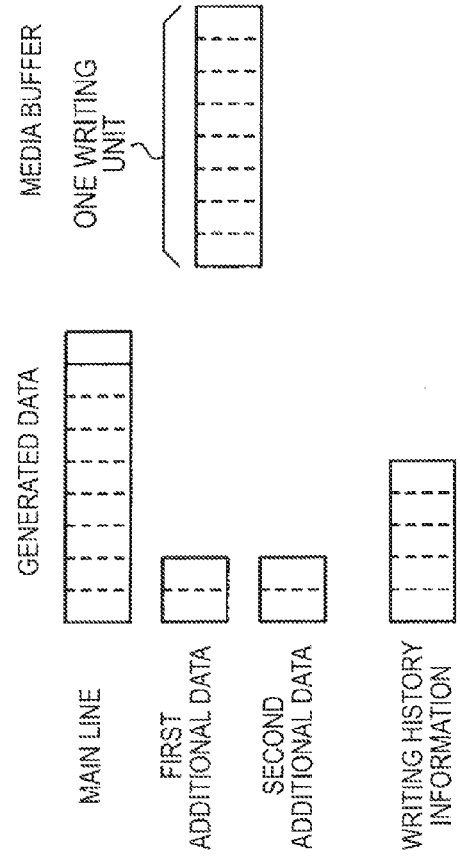

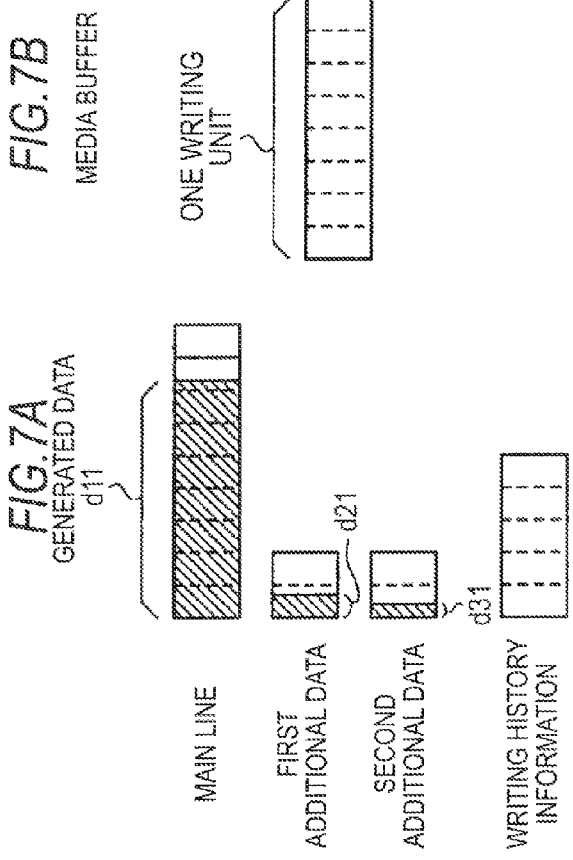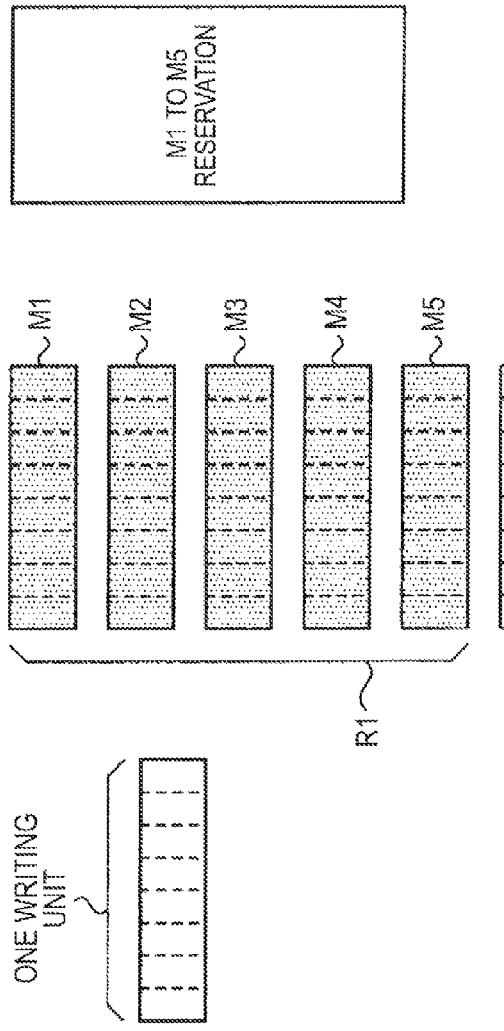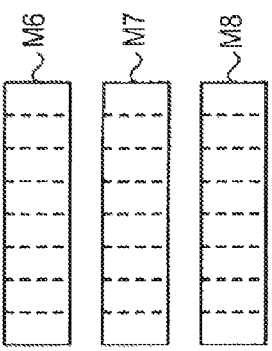

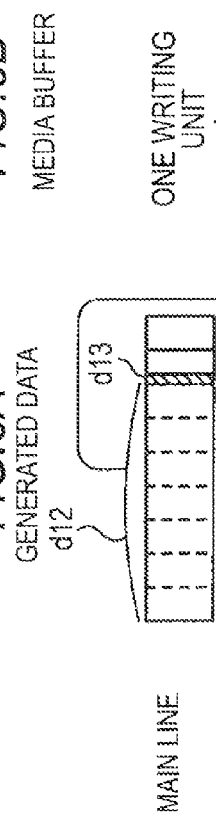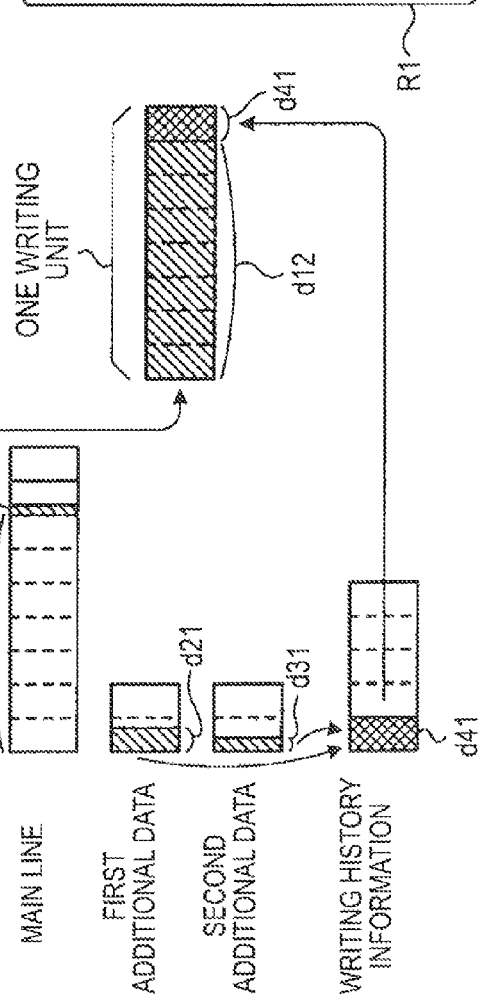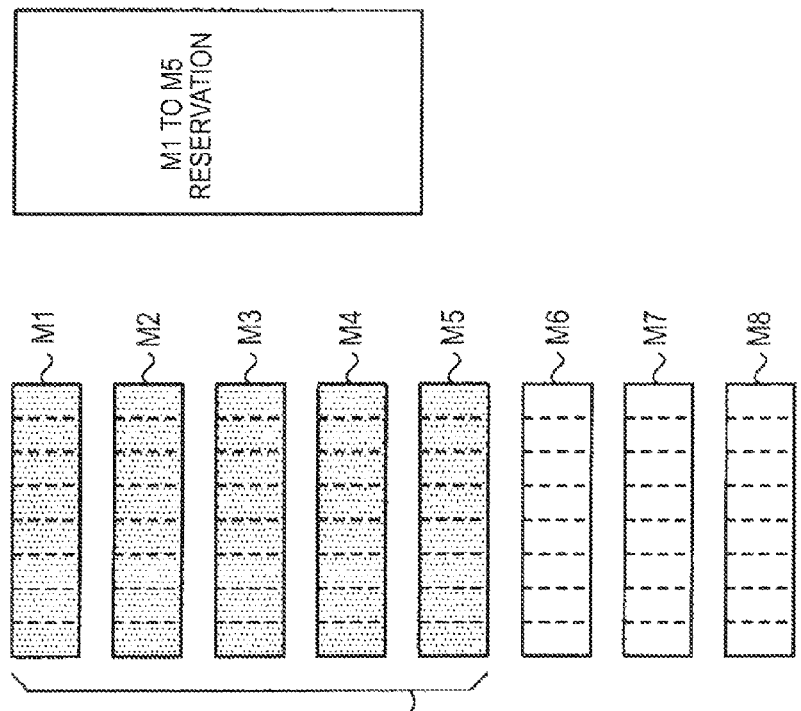

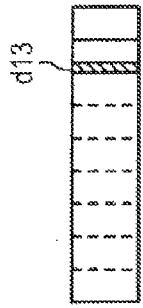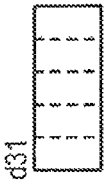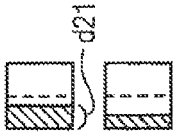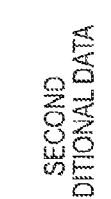

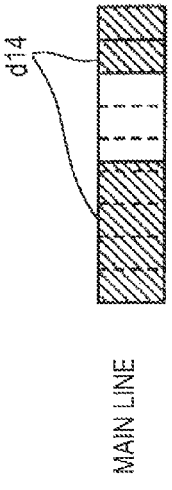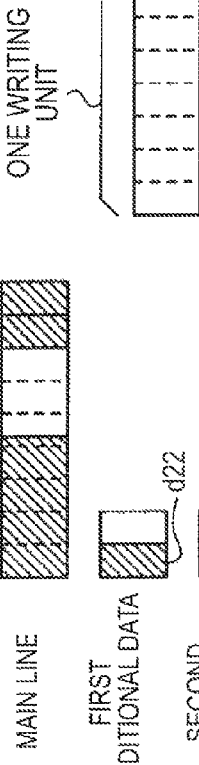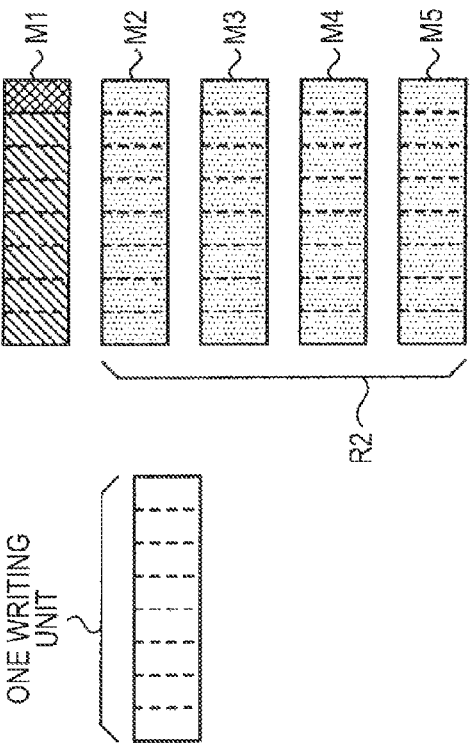

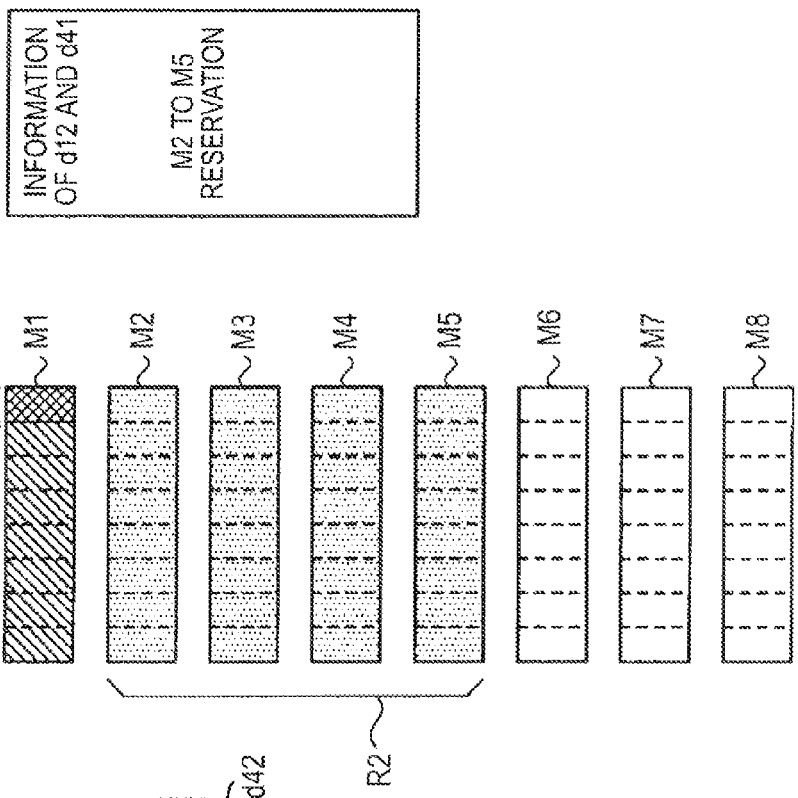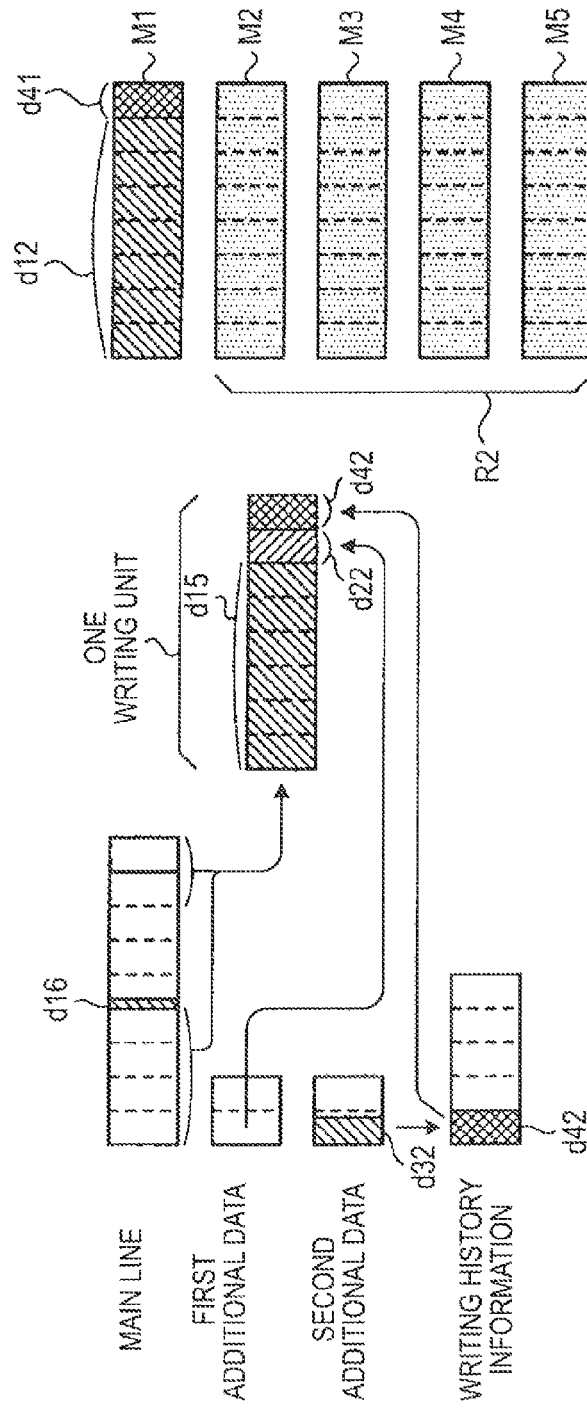

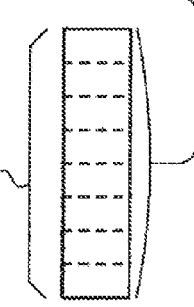
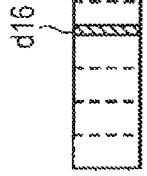

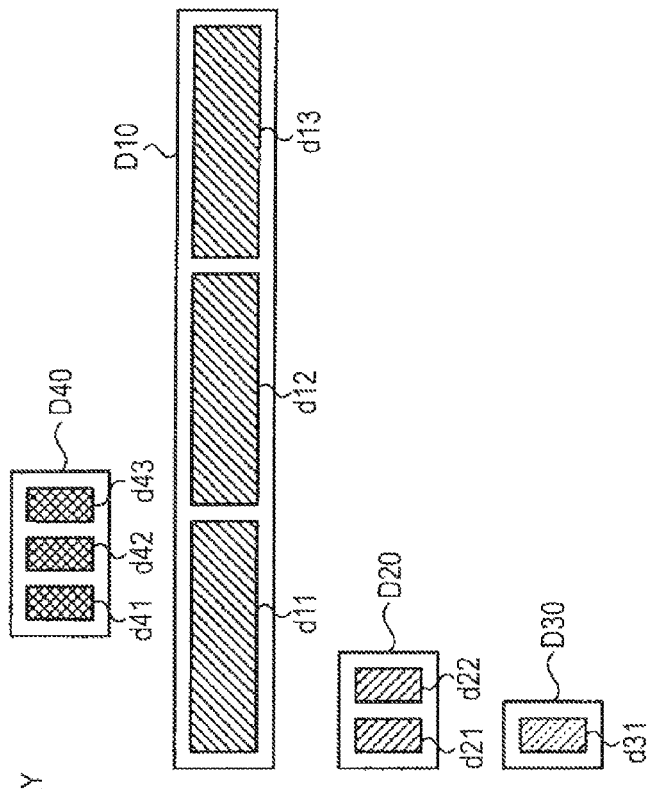
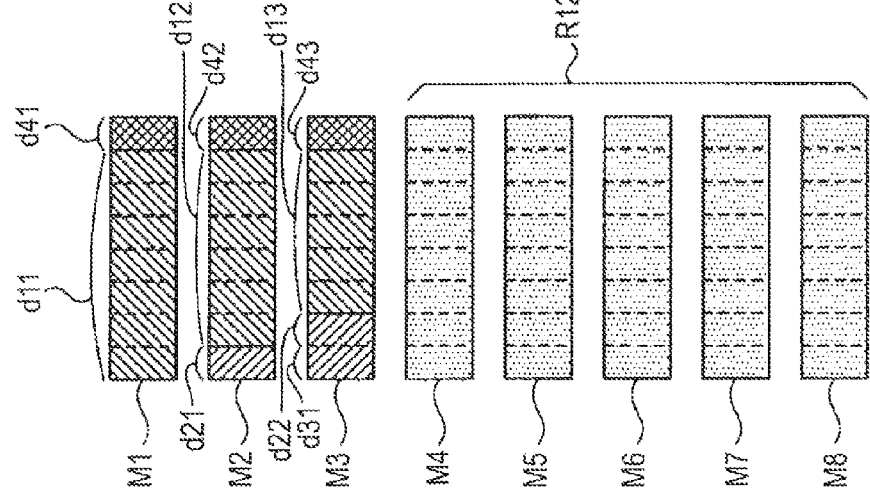
FIG. 13A RECORDING DATA OF MEDIUM
FIG. 13B EXAMPLE OF SORTING OF CONTINUOUS RECORDING DATA MANAGEMENT INFORMATION (UNRECORD)

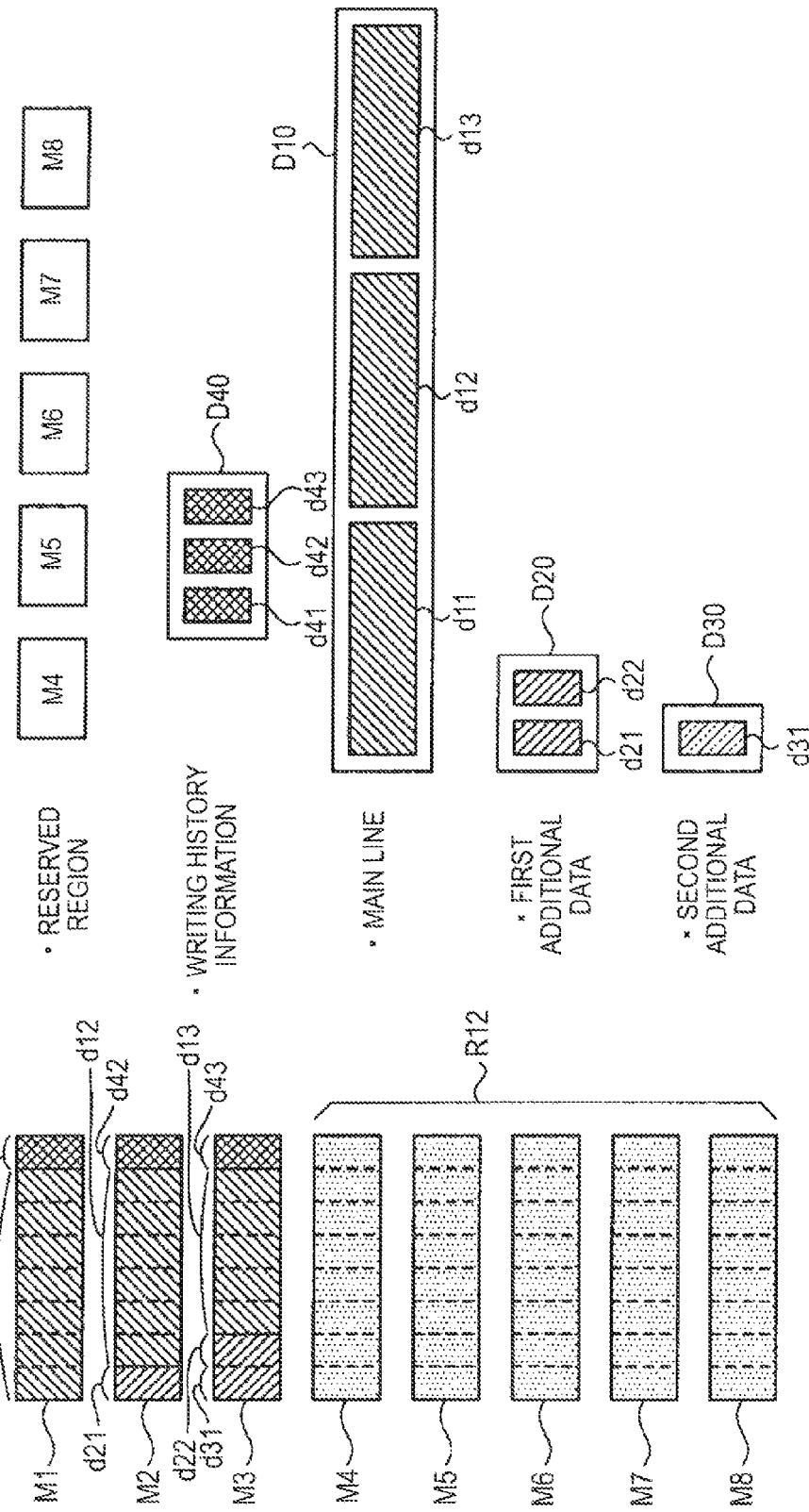

EXAMPLE OF VIDEO RECORDING END PROCESS

RECORDING DEVICE, IMAGING AND RECORDING DEVICE, RECORDING METHOD, AND PROGRAM

FIELD

The present disclosure relates to a recording device which records data in a recording medium such as a semiconductor memory, an imaging and recording device having the recording device, a recording method which is applied to the recording device and the imaging and recording device, and a program to execute the recording method.

BACKGROUND

As imaging devices such as video cameras, various imaging and recording devices having a recording function have been put to practical use. In recent years, an imaging and recording device which uses a memory card having a semiconductor memory as a recording medium has been developed due to widespread use of semiconductor memories and a reduction in costs.

The memory card is small and lightweight in comparison to a magnetic tape, various disks and the like, which have been used as a recording medium in an imaging and recording device, and using a memory card as a recording medium contributes to a reduction in the size of an imaging and recording device. In addition, the memory card is able to be easily mounted on and removed from a card slot which is provided in the main body of the imaging and recording device.

JP-A-2008-35394 discloses an example of the configuration of an imaging device which uses a semiconductor memory as a recording medium.

JP-T-2007-515002 discloses a process of storing metadata of a file system in a file which is referred to as the stream with name.

SUMMARY

When a semiconductor memory of a memory card or the like is used as a recording medium in a recording device such as a video camera, the following problems occur.

For example, when video data and the like are recorded in a semiconductor memory in a memory card which is mounted on a card slot of an imaging and recording device, the video data which is taken and obtained by an imaging portion is sequentially supplied to the memory card and recorded in the semiconductor memory in the memory card. The recording of data to a semiconductor memory is also referred to as storing or writing. However, in the present disclosure, the recording, the storing, and the writing are not particularly distinguished.

In the semiconductor memory, the writing speed can be increased by performing writing or erasure for each of designated units of data amounts. Accordingly, the supplied video data is not sequentially supplied to and recorded in the semiconductor memory as is, but is organized for each of designated units of data (recording unit) and then recorded in the semiconductor memory, and thus the speed of recording is increased. In the semiconductor memory, an erasure block corresponds to this recording unit.

Here, when the transfer rate of the video data which is taken and obtained by the imaging and recording device is comparatively high, the generated video data amounts to a data amount recording unit at a relatively short interval, and the video data is sequentially transferred to the recording medium and recorded in the semiconductor memory.

However, the generation rate of the obtained video data varies in accordance with imaging conditions and the like, and for example, when images of an object which rarely change are continuously taken, the data amount of the generated video data is lowered, whereby the generation rate may be reduced. Also in the case of imaging with a very long frame period, such as intermittent recording, the transfer rate may be reduced.

However, in the imaging and recording device, when an imaging operation of the imaging and recording device is suddenly interrupted for some reason, data which does not amount to the above-described recording unit in the video data which is taken and obtained by the imaging portion is not recorded in the memory card.

In addition, when the data is recorded in the recording medium, but is not reflected in file management information of the recording medium, the data is not handled as recorded data, and the recording data is substantially lost and is not recorded in the recording medium.

In a normal video camera, when an operation for stopping the imaging is performed, a recording stop process is performed, so that all taken pieces of video data are recorded in a recording medium and management information is also updated so as to be corresponding data. With regard to this, for example, when the supply of power to the imaging and recording device is suddenly stopped or the recording medium is removed during the course of imaging, the data which does not yet amount to the recording unit and the data of which the management information is not updated are lost.

Accordingly, in the recording of data which is sequentially transferred to the semiconductor memory, it is necessary to record the data as efficiently as possible without generating excess data which is not recorded in the recording device, and it is necessary to provide some measure. This problem also occurs even if the recording is performed in any mode. However, particularly, in the above-described case in which the transfer rate of the video data is low, there is a high possibility that the data which is not recorded in the memory card is video data of a relatively long duration.

In addition, in the recording of the video data in the semiconductor memory, as data other than the video data, it is necessary to record various additional data such as audio data, time code data, and data showing the correspondence between the video data and the audio data at the same time. In this case, the video data is organized as video data, the additional data is organized for each additional data type, and the organized pieces of data are individually recorded in each data recording region in the semiconductor memory.

However, when considering recording efficiency, in the process of dividing the recording regions in the semiconductor memory on the basis of the data type and recording the data in parallel, in accordance with the data type, the data may be recorded in the recording medium while not amounting to one recording unit. In greater detail, for example, the video data is generally generated at a relatively high rate, but in the case of the above-described additional data, the data generation rate is low, and recording only the additional data as one file is inefficient. Therefore, a problem occurs in that the recording capacity of the semiconductor memory is not effectively used.

As a method of solving these problems, for example, it is considered that for each recording of a certain amount of data in the semiconductor memory, some additional information for data rescue is recorded so that the certain amount of data is handled as recorded data. In the update of the management information, a process of handling the data recorded in the semiconductor memory as correct data as much as possible with reference to this additional information for data rescue is performed.

Such additional information for data rescue is a relatively small amount of data in comparison to the main data such as the video data. Deletion of only such a small capacity of data is not preferable from the point of view of the management of data recording and erasure of the semiconductor memory. In addition, due to various causes, it may be necessary to leave the additional information for data rescue in the semiconductor memory as is.

However, when the list of data recorded in the semiconductor memory is displayed by the file system, this additional information for data rescue is regarded as a file of data different from the major recording data such as the video data. This is not preferable because, in that case, a user judges the file as a file with unnecessary data recorded therein and may execute a process of erasing the data by mistake. Here, the additional information for data rescue has been described, but when various additional data other than the main data such as the video data are recorded in the semiconductor memory, the same problems occur.

Thus, it is desirable to rapidly and efficiently record data in a recording medium such as a semiconductor memory and appropriately record additional information for data rescue and the like.

According to an embodiment of the present disclosure, recording is performed in which input data is transferred to a recording medium and recorded in the recording medium using a certain file system. In addition, management is performed in which a partial region or some files in the data recorded in the recording medium are specified and set as recording information of an additional information region prepared in the file system.

In this manner, regarding the data or the files set as the recording information of the additional information region prepared in the file system, the additional information is not able to be accessed as long as a particular interface or the like suitable for the file system is not prepared. Accordingly, the files as additional information are not carelessly deleted and the recording data is excellently managed.

According to the embodiment of the present disclosure, a normal user is not able to access or delete files or data set as additional information. Accordingly, there is an advantage in that the recorded data is appropriately managed without the execution of deletion of a relatively small capacity of data which is necessary for management, but is thought to be unnecessary from a user's point of view.

BRIEF DESCRIPTION OF THE DRAWINGS

FIG. 4 is a flowchart showing an example of a writing process according to the embodiment of the present disclosure.

FIG. 5 is a flowchart showing an example of a process of generating data of writing history information according to the embodiment of the present disclosure.

FIGS. 6A to 6D show an explanatory diagram showing an example of a data recording state (process upon reservation) according to the embodiment of the present disclosure.

FIGS. 7A to 7D show an explanatory diagram showing an example of a data recording state (state in which one writing unit of data is input) according to the embodiment of the present disclosure.

FIGS. 8A to 8D show an explanatory diagram showing an example of a data recording state (generation of writing history information) according to the embodiment of the present disclosure.

FIGS. 9A to 9D show an explanatory diagram showing an example of a data recording state (writing from a media buffer) according to the embodiment of the present disclosure.

FIGS. 10A to 10D show an explanatory diagram showing an example of a data recording state (example in which additional information files amount to a file arrangement unit) according to the embodiment of the present disclosure.

FIGS. 11A to 11D show an explanatory diagram showing an example of a data recording state (input to the media buffer in a second cycle) according to the embodiment of the present disclosure.

FIGS. 12A to 12D show an explanatory diagram showing an example of a data recording state (writing process from the media buffer in the second cycle) according to the embodiment of the present disclosure.

FIGS. 13A and 13B show an explanatory diagram showing an example of sorting of management data (state in which management information is not recorded) according to the embodiment of the present disclosure.

FIGS. 14A and 14B show an explanatory diagram showing an example of a data recording state (state in which management information is recorded) according to the embodiment of the present disclosure.

DETAILED DESCRIPTION

An embodiment of the present disclosure will be described in the following order.

1. Example of Configuration of Entire Imaging Device (FIG. 1)
2. Example of Configuration of Data Recording to Recording Medium (FIG. 2)
3. Description of Data Recording Unit (FIG. 3)
4. Data Recording Operation (FIG. 4, FIG. 5)
5. Specific Examples of Data Recording Operation (FIGS. 6A to 12D)
6. Examples of Sorting of Management Data (FIGS. 13A to 14B)
7. Example of Management Data after Video Recording End Process (FIGS. 15 and 16)
8. Modified Examples 1. Example of Configuration of Entire Imaging Device In this embodiment, an example will be described in which a memory card which is a detachable recording medium is used and applied to an imaging device 1 capable of recording and reproducing the image and the sound. Accordingly, the imaging device 1 is an imaging and recording device having a recording function or a device for imaging, recording and reproduction, but is simply referred to as the imaging device.

In addition, in this embodiment, the recording medium is referred to as the memory card. However, there is no need to have a card shape if it is a removable recording medium with a built-in semiconductor memory. Other than the memory card, various commercialized memory devices can be applied. A recording medium other than the semiconductor memory may be used.

Figure 1:
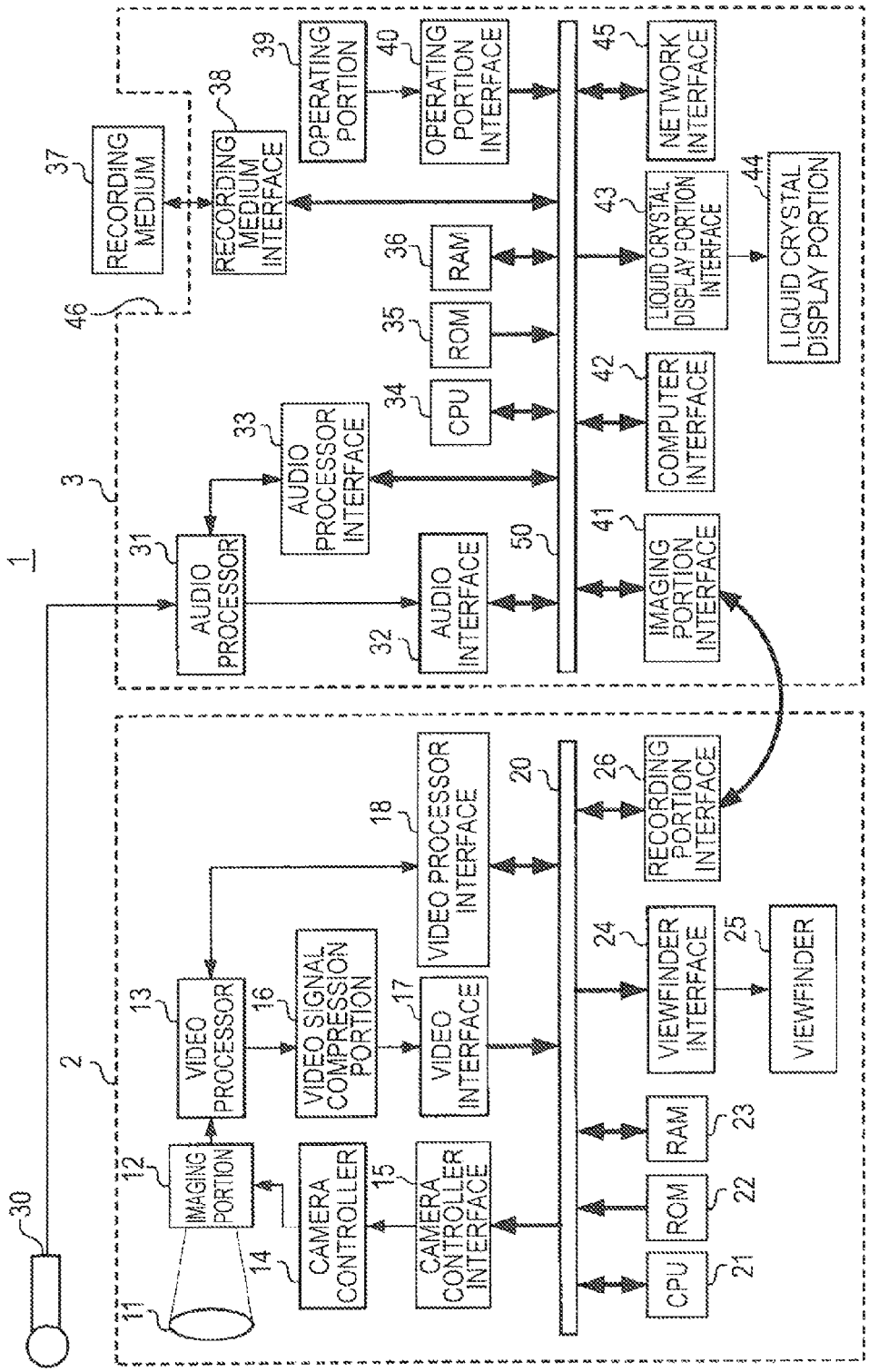
FIG. 1 is a block diagram showing an example of the configuration of an imaging device according to an embodiment of the present disclosure.

FIG. 1 is a block diagram showing an example of the internal configuration of the imaging device 1 of this example. The imaging device 1 is generally constituted of an imaging portion 2 which controls a video camera and generates video data, and a recording portion 3 which records video data, audio data and metadata in a semiconductor memory and reproduces the data.

First, constituent portions of the imaging portion 2 will be described. Imaging light which is input via an optical portion 11 constituted of a lens, an aperture, a filter and the like is subjected to photoelectric conversion by an imaging portion 12 to generate an analog video signal. The imaging portion 12 is constituted of a solid-state image sensing device such as a Charge Coupled Device (CCD) imager. The imaging signal which is obtained by the imaging portion 12 is supplied to a video processor 13 having an analog/digital converter, an image adjustment function, and the like. The video processor 13 converts the supplied imaging signal into digital video data and performs image adjustment. In addition, the video processor 13 supplies the converted digital video signal to a video signal compression portion 16 which compresses digital video data by a predetermined method. The video signal compression portion 16 subjects the supplied digital video signal to compression coding to Moving Picture Experts Group (MPEG) format and the like. The video signal compression portion 16 supplies the compressed video data to a data bus 20 via a video interface 17. The compressed video data is supplied to the recording portion 3 via a recording portion interface 26 to be described later, and stored in a semiconductor memory in a recording medium 37 to be described later. The data which is used in the imaging portion 2 is transmitted to the respective portions via the data bus 20.

As a result of the user operation by an operating portion 39 to be described later, an operation signal is supplied to a CPU 21 via an imaging portion interface 41 to be described later, the recording portion interface 26 and the data bus 20 from the recording portion 3. The Central Processing Unit (CPU) 21 is a controller which controls the processes of the portions in the imaging portion 2, and interprets the supplied, operation signal. In the interpretation of the operation signal, the CPU 21 reads out a control program from a ROM 22 at a predetermined timing, and temporarily stores temporary data, metadata and the like in a RAM 23. The Read Only Memory (ROM) 22 is a memory allowing read-out only, and the Random Access Memory (RAM) 23 is a memory allowing writing.

The CPU 21 converts the operation signal supplied from the operating portion 39 into a control signal to drive the imaging portion 12, and supplies the signal to a camera controller 14 via a camera controller interface 15. The camera controller 14 controls the aperture, the zoom, the filter and the like of the imaging portion 12 on the basis of the supplied control signal. In addition, the CPU 21 supplies an image processing signal to the video processor 13 via a video processor interface 18 to instruct image processing. The video processor 13 performs the digital video signal compression and the like on the basis of the supplied image processing signal.

The imaging portion 2 has a viewfinder 25 which displays images during the recording, reproducing images, metadata and the like. The images during the recording, the reproducing images, the metadata and the like transmitted via the data bus 20 are displayed on the viewfinder 25 having a liquid crystal screen via a viewfinder interface 24.

Next, constituent portions of the recording portion 3 will be described. A microphone 30 facing an object collects the sound therearound and generates analog audio data. The microphone 30 supplies the analog audio signal to an audio processor 31 having an analog/digital converter, a sound adjustment function, and the like.

The audio processor 31 converts the supplied analog audio signal into digital audio data, and performs sound adjustment. In addition, the audio processor 31 supplies digital audio data to a data bus 50 via an audio interface 32. The digital audio data is stored in a semiconductor memory in the memory card 37 to be described later. The data which is used in the recording portion 3 is transmitted to the respective portions via the data bus 50.

The operating portion 39 constituted of a button, a switch (not shown) and the like is used in the recording, reproduction and editing operation of the imaging portion 2 and the recording portion 3. The operating portion 39 generates an operation signal by a manual operation of the start of imaging and the like. The generated operation signal is supplied to a CPU 34 which controls the processes of the portions in the recording portion 3 via an operating portion interface 40 and the data bus 50 from the operating portion 39. In addition, in the recording, the operation signal is supplied to the imaging portion 2 via the imaging portion interface 41 to be described later. The CPU 34 interprets the supplied operation signal, reads out a control program from a ROM 35 allowing read-out only at a predetermined timing, and temporarily stores temporary data, parameters and the like in a RAM 36 allowing writing.

The imaging device 1 of this example has a configuration in which the recording portion 3 has a card slot 46 and the recording medium (memory card) 37 can be removably mounted on the card slot 46. The recording medium 37 is a recording medium with a built-in semiconductor memory. The data recording state in the recording medium 37 will be described later.

The recording medium 37 mounted on the card slot 46 can perform data transfer to and from a data processing portion in the recording portion 3 via a recording medium interface 38. The data recording to the recording medium 37 is performed by using a certain file system, and the recording medium interface 38 performs control of the recording and the like based on the file system.

In the configuration of FIG. 1, only one card slot 46 is shown. However, the recording portions 3 may be configured to have a plurality of card slots. In addition, separately from the recording medium 37 mounted on the card slot 46, the recording portion 3 may have a recording medium such as a memory and a hard disk to record video data therein.

For data transfer to and from the imaging portion 2, in the recording portion 3, the imaging portion interface 41 is connected to the data bus 50. The imaging portion interface 41 functions as an input portion which performs a process of inputting video data and the like. The video data imaged by the imaging portion 2 is supplied to and recorded in the recording medium 37 via the recording portion interface 26, the imaging portion interface 41, the data bus 50, and the recording medium interface 38. In this recording, the CPU 34 functions as a recording control portion and a control process for recording is executed.

The CPU 34 prompts a liquid crystal display portion 44 having a liquid crystal screen to display monitor images, time codes, audio levels, metadata, various menus and the like via the data bus 50 and a liquid crystal display portion interface 43. The video data, audio data and the like read out from the recording medium 37 can also be displayed as video images which are reproduced by the liquid crystal display portion 44.

The imaging device 1 has a computer interface 42 which is used to transfer data to and from an external computer. The computer interface 42 which is an interface specified by, for example, the USB specification can be connected to an external computer device (not shown) to transmit data, or can be connected to a speaker to emit audio data which is reproduced. In addition, the imaging device 1 has a network interface 45 which is used to transfer data through the network. The network interface 45 can be connected to a server or an external computer device (not shown) to transmit data.

2. Example of Configuration of Data Recording to Recording Medium

Next, the configuration of a process for recording video data and the like in the recording medium 37 in this imaging device 1 will be described with reference to FIG. 2.

Figure 2:
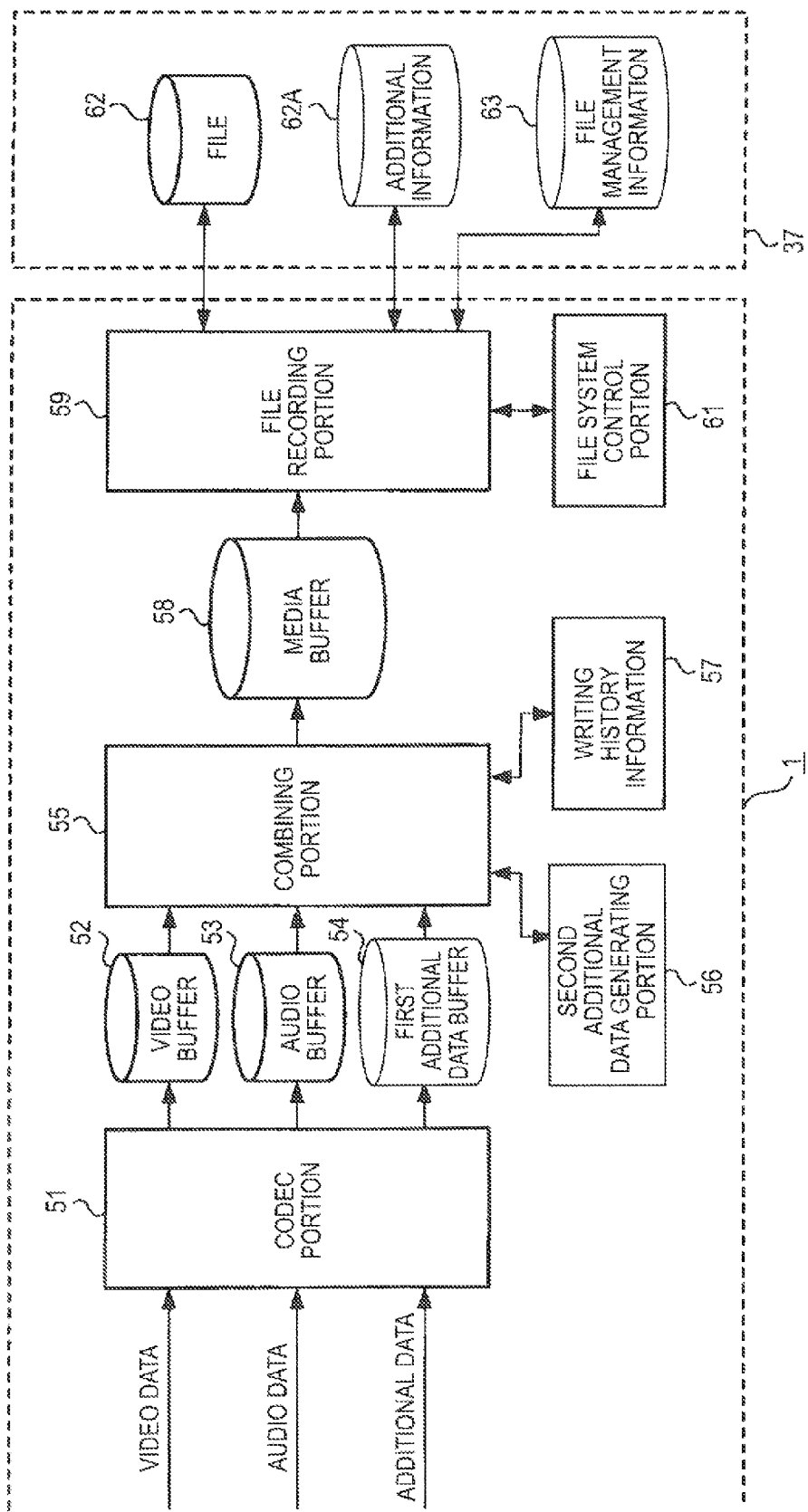
FIG. 2 is a block diagram showing an example of a configuration of data recording according to the embodiment of the present disclosure.

FIG. 2 is a functional block diagram of the flow of data which is recorded. The respective processes shown in FIG. 2 are performed by using the video processor 13, the CPU 21, the CPU 34, the RAM 23, the RAM 36 and the like shown in FIG. 1. Accordingly, the video processor 13, the CPU 21, the CPU 34, the RAM 23, and the RAM 36 function as a data arrangement portion which executes a process of arranging data for recording.

In this embodiment, in the recording of video data in the recording medium 37, additional information files and writing history information which are additional data, other than the video data and audio data which are the main data, are recorded. The data of the additional information files is data (metadata) such as a time code which is generated with the generation of video data. These pieces of additional data are generated in a predetermined block in the imaging portion 2 or the recording portion 3, and input to a recording system of the recording portion 3. The time code is a code showing a time of each frame position.

In the following description, these pieces of additional data are first additional data, and are distinguished from second additional data to be described later.

As shown in FIG. 2, video data, audio data, and first additional data are supplied to a codec portion 51 to be encoded and decoded for recording purposes, and then accumulated in an individual buffer for each data. That is, a video buffer 52, an audio buffer 53, and an additional information buffer 54 are provided and input data corresponding to the respective buffers 52, 53, and 54 are accumulated.

The data accumulated in the respective buffers 52, 53, and 54 is supplied to a combining portion 55 to be combined into a single item of data, and is accumulated in a media buffer 58. The media buffer 58 is a portion which stores one recording unit of a data amount, which is the amount of data which is recorded through one time of recording in the recording in the recording medium 37. In this example, the amount of data which is recorded through one time of recording in the recording medium 37 corresponds to one minimum unit of a data amount in the erasure of data from the recording medium 37.

A second additional data generating portion 56 and a writing history information generating portion 57 are connected to the combining portion 55. The second additional data generating portion 56 generates data (second additional data) as a pointer showing the correspondence between the video data and the audio data and inputs the data to the combining portion 55.

The writing history information generating portion 57 is a processing portion which generates writing history information which is added for each recording of one unit of data in the recording medium 37. The writing history information will be described later in detail. This writing history information is used as writing completion information showing that the state of writing to the recording medium is normal.

The generated second additional data and writing history information are also combined by the combining portion 55. Although not shown in the drawing, a configuration is provided in which the second additional data is also supplied to the combining portion 55 in units of data amounts of a level at which the data generated in the generating portions 56 is accumulated in an internal buffer. The wiring history information is generated for each recording of one unit of data in the memory card 37.

When recording data is supplied to the media buffer 58 from the combining portion 55 and the amount of accumulated data in the buffer 58 amounts to one recording unit of a data amount, the output to a file recording portion 59 from the media buffer 58 is performed by the control of the CPU 34 which is a recording control portion. The data which is supplied to the file recording portion 59 is output to the recording medium 37 and recorded as a file 62 in the recording medium 37. The management data of the file 62 is recorded as file management information 63 in a different region from the file 62. The data which is recorded in this file management information 63 is controlled by a file system control portion 61 connected to the file recording portion 59. The file system control portion 61 performs a process of controlling the recording by a certain file system which is applied in the imaging device 1 of this embodiment.

The accumulated data in the media buffer 58 is sent to the recording medium 37 in order from a front block, and is recorded in the file 62 in the recording medium 37 in the sending order.

3. Description of Data Recording Unit

Figure 3:
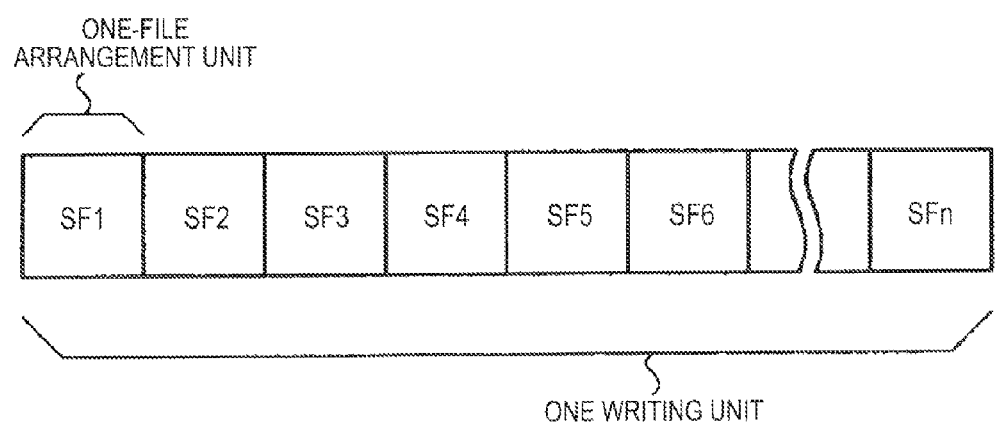
FIG. 3 is an explanatory diagram showing an example of a data recording unit according to the embodiment of the present disclosure.

FIG. 3 is a diagram showing the concept of a data recording unit in the recording medium 37.

As shown in FIG. 3, one writing unit (one recording unit) is set to have a capacity of the integer multiple of one file arrangement interval (one block). That is, one file writing unit is configured in a block arrangement of SF1, SF2, . . . , SFn (n is an integer). Here, one file writing unit corresponds to an erasure block unit of the semiconductor memory in the recording medium 37. In the recording medium 37 which is used in this embodiment, high-speed access is possible through access at this one file arrangement interval. The one file arrangement interval is constituted of a "plural-sector unit" with a capacity of the integer multiple of "one sector" which is a minimum unit for access to the recording medium. The "plural-sector unit" is a minimum unit for high-speed access.

One file arrangement interval (one block) is a data amount of, for example, 2 MB. For example, when one block is 2 MB and one writing unit is 16 MB, the one writing unit is constituted of 8 blocks. The media buffer 58 shown in FIG. 2 has a storage capacity in this one writing unit. These values and the number of blocks are an example.

4. Data Recording Operation

Next, a data recording operation in the imaging device of this embodiment will be described with reference to FIGS. 4 and 5.

As shown in FIG. 4, when the recording of video data (video recording) is started, a process of reserving a recording region in the recording medium is performed in the CPU 34 which controls the recording (Step S11). This recording region reservation process is performed in units of the integer multiple of one writing unit shown in FIG. 3. In order to fix the reservation, management data is written in file management information 63 of the memory card 37 and the management information is updated (Step S12).

In this manner, the reservation is performed only by writing to the management information of the recording medium, and the actual reserved recording region is just reserved and is not particularly processed. When the region has data which was written therein, the data still remains and is not erased.

In addition, in the CPU 34 which controls the recording, it is determined whether or not one writing unit of recording data is accumulated in the media buffer 58 (Step S13). In the determination, when it is determined that one writing unit of recording data is accumulated, the data accumulated in the media buffer 58 is transferred to the recording medium 37 to be recorded in the file 62 which is a recording portion of the recording medium 37 (Step S14). At this time, for example, the data is sent to the recording medium 37 in order from the data at the front of the media buffer 58, and is written in the recording portion in the recording medium 37 in order from the data at the front to record the one writing unit of recording data as a single file.

Thereafter, the data collectively recorded in one recording unit is sorted for each data type (Step S15). This sorting process is performed by rewriting of the file management information which is managed by the file system, and the data types to be sorted are distinguished on the basis of the data when the recording data is arranged in the media buffer 58. The data sorting process is performed in the file system control portion 61 of FIG. 2. At this time, in the file management information 63 of the recording medium 37, the writing is not yet performed, and the management data in which the sorting process has been performed is held by the file system control portion 61.

Next, it is determined whether or not the remaining amount of the reserved region in the recording medium 37 is less than a certain amount and it is necessary to increase the reserved region (Step S16). In this determination, when it is necessary to increase the reserved region, a corresponding region reservation process is performed (Step S17). This region reservation process is also performed in the file system control portion 61 of FIG. 2. At this time, the writing is not yet performed in the file management information 63 of the recording medium 37, and the management data subjected to the sorting process is held by the file system control portion 61.

Thereafter, an update process of collectively recording the management data generated by the sorting process in Step S15 and the management data generated by the region reservation process in Step S17, which are not updated but held, in the file management information 63 in the recording medium 37 is performed (Step S18).

Returning to the description of FIG. 4, after the update process in Step S18, the process returns to the determination of the data amount in Step S13.

In addition, when it is determined that one writing unit of recording data is not accumulated in the media buffer 58 in Step S13, it is determined whether or not a time $t_o$ set in advance has elapsed from the previous data writing to the recording medium 37 (Step S19). The set time $t_o$ is set to, for example, 20 seconds.

When it is determined that the time $t_o$ has elapsed, the process proceeds to Step S14, and the data accumulated in the buffer 58 at that time is written in the recording medium 37. Also at this time, the data of writing history information is added to the data to be written.

In Step S19, when the time $t_o$ has not yet elapsed from the previous writing, the process returns to the determination in Step S13.

In addition, in Step S16, also in the case in which it is determined that it is not necessary to increase the reserved region, the process returns to the determination in Step S13. Accordingly, the file management information 63 of the recording medium 37 is collectively updated with the management data up to now related to the written data only when the reserved region is increased, so that the number of update of the file management information 63 is small.

Next, an example of the process of generating the data of writing history information will be described with reference to the flowchart of FIG. 5. This generation of the data of writing history information is executed in the writing history information generating portion 57 of FIG. 2.

As shown in FIG. 5, it is determined whether or not it is time to write one writing unit accumulated in the media buffer 58 to the recording medium 37 (step S21). When it is not time to write, the process is deferred until it becomes time to write.

When it is determined that it is time to write, it is determined whether or not data which does not amount to one file arrangement of a data amount is accumulated in first additional data and second additional data (Step S22).

Here, when there is data which does not amount to one file arrangement of a data amount, the pieces of data which do not amount to one file arrangement of a data amount of the first additional data and the second additional data are arranged as the data of writing history information (Step S23). However, when even writing history information generated at the previous time is arranged in the same first additional data and second additional data, the data of differences between the writing history information at the previous time and the first and second additional data is arranged.

Furthermore, as the data of writing history information, data showing the arrangement of various data in one writing unit of data is added. In addition, as the data of writing history information, data with regard to the version, the completion of data and the like is added in accordance with the need. By adding these pieces of data, the data of writing history information becomes one writing unit of a data amount (Step S24).

The generated data of writing history information is supplied to the media buffer 58 and stored in a region at the end of the media buffer 58 (Step S25). When the data of writing history information is arranged at the end of the media buffer 58, this writing history information is read out finally, and transferred to and written in the recording medium 37 when the data transfer from the media buffer 58 to the recording medium 37 is performed.

In a state in which the writing history information is correctly written in the recording medium 37 in this manner, writing units of data written together with the writing history information, can be handled as effective data which is correctly written in the recording medium 37. Accordingly, the writing history information is also used as writing completion information showing that the recording state of one writing unit of recording data to the recording medium is normal.

When the writing history information which is arranged and written in the recording medium 37 in this manner is used, restoration for the case in which the recording to the recording medium 37 is interrupted for some reason is possible. That is, it is possible to determine how far data has been written in the reserved region from this writing history information.

In addition, when there is a video recording end operation or the like in the imaging device 1 and thus a video recording end process (recording end process) is performed, the writing history information written in the recording medium 37 is registered as information of additional information 62A (see FIG. 2). The additional information 62A is additional information which is referred to as the named stream prepared in the applied file system. The additional information which is referred to as the named stream is not able to be accessed as long as a particular interface or the like suitable for the file system is not prepared. That is, when a list of files which are recorded in the recording medium 37 is displayed using a normal interface, the additional information files are not displayed and become data hidden from a user's point of view.

The additional information which is referred to as the named stream may be referred to as a different name in accordance with the file system. For example, it may be referred to as the stream with name, the alternate data stream, the fork, and the like. Any of these pieces of additional information is particular additional information which is prepared in the file system, and normally functions as additional information which is hidden from a user's point of view. Since the information is hidden data, a normal user is not able to access the information and the information is not able to be deleted by a normal file operation.

5. Specific Examples of Data Recording Operation

Next, specific examples of the recording operation will be described with reference to FIGS. 6A to 12D.

In FIGS. 6A to 12D, FIGS. 6A, 7A, 8A . . . , and 12A show a state of accumulation of data input to the recording portion or data generated in the recording portion. In greater detail, the data corresponds to data which is accumulated in the respective buffers 52, 53, 54 and the like of FIG. 2. The main line data is the data of a video-audio multiplex file in which video data and audio data, which are main data, are multiplexed. First additional data and second additional data are the above-described additional data, and writing history information is the above-described data which is generated when the recording is performed.

In FIGS. 6A to 12D, FIGS. 6B, 7B, 8B, . . . , and 12B show a state of accumulation of data in the media buffer 58.

In FIGS. 6A to 12D, FIGS. 6C, 7C, 8C, . . . , and 12C show a recording state (a part thereof) of each region in the recording medium 37.

In FIGS. 6A to 12D, FIGS. 6D, 7D, 8D, . . . , and 12D show management data which is written as file management information.

In FIGS. 6A to 12D, a description is given with an example in which one recording unit is constituted of eight-file arrangement, and as the recording regions in the recording medium 37, only eight recording areas M1 to M8 are shown. One recording area M1 has a recording capacity in which one recording unit of data is recorded.

In FIGS. 6A to 12D, the state in which the respective regions are blank is a state in which no data is written. The shaded region shows a state in which data is recorded, or a state in which the reserved is made.

Hereinafter, a description will be given in order from FIGS. 6A to 6D.

First, using FIGS. 6A to 6D, an example of the reservation process in Step S11 and an example of the process of writing the reservation information as management data in Step S12 will be described.

In the state of FIGS. 6A to 6D, as shown in FIG. 6A, there are no input data or generated data, and as shown in FIG. 6B, noting is accumulated in the media buffer 58. In this state, a plurality of recording areas are reserved in advance in the memory card. In this example, as shown in FIG. 6C, five recording areas M1 to M5 are secured as a reserved region R1. Regarding the securing of the areas as this reserved region R1, data (data showing that the areas M1 to M5 are reserved) with regard to this reserved region R1 is recorded as management data in a region in the file management information 63 which is managed by the file system control portion 61 on the side of the recording medium 37 in Step S12. However, in this state, even when there is recorded data in the reserved region R1, a process of erasing the recorded data is not performed.

FIGS. 7A to 7D show a state in which one recording unit of data is input or generated in the state in which the region is reserved in FIGS. 6A to 6D. Here, as shown in FIGS. 7A to 7D, as the main line data (video data and audio data), data d11 of a data amount exceeding a seven-file arrangement unit is accumulated in the buffer. Each of first additional data d21 and second additional data d31 has a data amount less than one recording unit of a data amount.

FIGS. 8A to 8D show an example of the generation of the writing history information and the writing to the media buffer in the case of data input of FIGS. 7A to 7D.

In this state, the first additional data d21 and the second additional data d31, each of which has a data amount less than one recording unit of a data amount, are arranged in data d41 of the writing history information as is. The arrangement process corresponds to the process of Step S23 in the flowchart of FIG. 5. In the first additional data d21 and the second additional data d31, omittable data may be omitted and arranged in the writing history information.

In addition, arrangement data showing the position of each file arrangement unit of data in eight-file arrangement unit of data arranged in the media buffer 58 is added in the writing history information. This process corresponds to the process of Step S24 in the flowchart of FIG. 5. The data of the writing history information generated by the above processes is data of one-file arrangement unit of a data amount.

In addition, as the main line data, seven-file arrangement unit of data d12 in the data d11 of a data amount exceeding a seven-file arrangement unit is transferred to the media buffer 58 to be accumulated therein. Furthermore, the data d41 of the writing history information is accumulated in the one-file arrangement unit of region at the end of the media buffer 58. Data d13 which is less than the one-file arrangement unit of the main line data remains in the video buffer or the like, and an accumulation process thereof is performed as is. The first additional data d21 and the second additional data d31 arranged in the data d41 of the writing history information also remain in the respective buffers and an accumulation process thereof is continuously performed as is.

The one recording unit of data is accumulated in the media buffer 58 by the above processes, and the process proceeds to a writing process of FIGS. 9A to 9D.

In the writing process of FIGS. 9A to 9D, the one recording unit of data accumulated in the media buffer 58 is transferred to the recording medium 37 in order from the data at the front of the buffer, and is recorded in an area (here, area M1) at the front in the reserved region. The recording state in the area M1 is the same as the accumulation state in the media buffer 58. The main line data d12 is arranged in a seven-file arrangement unit of section from the front, and the data d41 of the writing history information is arranged in a one-file arrangement unit of section at the end.

When the data recording is performed in this manner, as shown in FIG. 9D, it is found that in the management data, the main line data d12 and the data d41 of the writing history information are arranged in the area M1. In addition, the area M1 changes to the recorded region from the reserved area, and a reserved region R2 changes to the areas M2 to M5. However, at this time, the updated management data is held in the file system control portion 61 of FIG. 2, but is not yet recorded in the recording medium 37.

FIGS. 10A to 10D show a state in which one writing unit of data, which is one recording unit of data, is newly input or generated in the state in which the writing is performed in FIGS. 9A to 9D. Here, as shown in FIGS. 10A to 10D, as the main line data (video data and audio data), data d14 of a data amount exceeding a six-file arrangement unit is accumulated in the buffer. The buffer for the main line shown in FIG. 10A is a ring buffer and the accumulation position sequentially changes.

Furthermore, also in first additional data d22, one-file arrangement unit of data is accumulated. In second additional data d32, data of a data amount less than one-file arrangement unit of a data amount is accumulated again.

FIGS. 11A to 11D show a state of the writing in the media buffer 58 and a writing history information generation state when the data is accumulated in the state of FIGS. 10A to 10D.

In this state, as the main line data, six-file arrangement unit of data d15 in the data d14 (FIGS. 10A to 10D) of a data amount exceeding a six-file arrangement unit is transferred to the media buffer 58 to be accumulated therein. In addition, the one-file arrangement unit of first additional data d22 is transferred to the media buffer 58 to be accumulated therein. Furthermore, data d42 of the writing history information is accumulated in the one-file arrangement unit of region at the end of the media buffer 58.

In this data d42 of the writing history information, the second additional data d32 of a data amount less than one-file arrangement unit of a data amount is arranged. At this time, the data of differences between the writing history information at the previous time, and the second additional data d31 arranged in the data d41 and the second additional data d32 is arranged as the data d42.

The eight-file arrangement unit of data, which is one recording unit of data, is accumulated in the media buffer 58 by the above processes, and the process proceeds to a writing process in a second cycle of FIGS. 12A to 12D. In the buffer of each data, main line data d16 which is less than the one-file arrangement unit remains and PP data d32 which is less than the one-file arrangement unit remains. Following the remaining data, the accumulation is performed as is.

In the writing process of FIGS. 12A to 12D, one recording unit of data accumulated in the media buffer 58 is transferred to the recording medium 37 in order from the data at the front of the buffer, and is recorded in a blank area (here, area M2) at the front in the reserved region. The recording state in the area M2 is the same as the accumulation state in the media buffer 58. The main line data d15 is arranged in a six-file arrangement unit of section from the front, the first additional data d22 is arranged in a next one-file arrangement unit of section, and the data d42 of the writing history information is arranged in a one-file arrangement unit of section at the end.

When the data recording is performed in this manner, as shown in FIG. 12D, it is found that in the management data, the main line data d12 and the data d41 of the writing history information are arranged in the area M2. In addition, the area M2 changes to the recorded region from the reserved area, and a reserved region R3 changes to the areas M3 to M5. Also at this time, the updated management data is held in the file system control portion 61 of FIG. 2, but is not yet recorded in the recording medium 37.

When the reserved region changes and the remaining amount of the reserved region is equal to or less than a predetermined amount, a process of increasing the reserved region is performed. This process of increasing the reserved region is performed in Step S17 in the flowchart of FIG. 4. Then, the management data of which the reserved region is increased and the management data as a result of the sorting in Step S15 are collectively recorded at the same time in the file management information 63 on the side of the recording medium 37 in step S18.

6. Examples of Sorting of Management Data

Next, specific examples of the data sorting process which is performed in Step S15 in the flowchart of FIG. 4 will be described with reference to FIGS. 13A to 14B. Here, a process is performed in which regarding a piece of data in a continuous region in which a set of video data and audio data is recorded on the recording medium, the management information thereof is sorted management information.

In the example of FIGS. 13A and 13B, FIG. 13A shows recording states of the respective areas in the recording medium, and FIG. 13B shows a management data generation state. However, in the state of FIG. 13B, the management data is only generated, and the generated data is not recorded in the file management information 63 (FIG. 2) of the recording medium 37.

In this example, as shown in FIG. 13A, a state is shown in which data is recorded in three areas M1, M2, and M3, and main line data d11, d12, and d13, first additional data d21 and d22, and second additional data d31 are divided into the three areas and recorded. As shown in FIGS. 6A to 12D, the data is recorded to these three areas M1, M2, and M3 in order of data generation.

At this time, recording addresses (recording regions) at which data d41, d42, and d43 of writing history information at the ends of the areas M1, M2, and M3 are positioned are collectively set as management data D40 of a piece of writing history information.

In addition, on the basis of the information when performing control to arrange the data in the media buffer 58, recording addresses at which the main line data d11, d12, and d13 are recorded are determined. In addition, management data D10 showing the recording addresses of the main line data d11, d12, and d13 and the like is generated.

Similarly, on the basis of the information when performing control to arrange the data in the media buffer 58, recording addresses at which the first additional data d21 and d22 are recorded are determined, and management data D20 showing the recording addresses of the first additional data d21 and d22 and the like is generated.

In addition, on the basis of the information when performing control to arrange the data in the media buffer 58, a recording address at which the second additional data d31 is recorded is determined, and management data D30 showing the recording address of the second additional data d31 and the like is generated.

In the state shown in FIGS. 13A and 13B, the management data is only generated, and the process of Step S15 in the flowchart of FIG. 4 is performed. The management data is not yet recorded as the file management information 62 of the memory card 37.

Next, the processes of Steps S16 and S17 in the flowchart of FIG. 4 are performed and the process proceeds to a process of a state shown in FIGS. 14A and 14B.

That is, first, as shown in Step S16 in the flowchart of FIG. 4, a necessary data amount (here, five-file arrangement unit of a data amount) is secured as a reserved region. Accordingly, area M6, M7, and M8 become the reserved region newly, and this is shown by the management data.

Furthermore, as the process of Step S17 in the flowchart of FIG. 4, the management data generated by the process shown in FIGS. 13A and 13B, and the management data with regard to the areas M6, M7, and M8 which newly become the reserved region, that is, the management data shown in FIGS. 14A and 14B are collectively written as the file management information 63.

The written management data is read out and used for management of the main line data (video data and the like) and the additional data.

7. Example of Management Data after Video Recording End Process

After the recording to the recording medium 37 in this manner, there is a recording stop operation such as a video recording end operation in the imaging device 1. When a recording stop process is performed, the writing history information (information D40 in FIG. 14B) is registered as the recording of additional information through the update of the management information.

Figure 15:
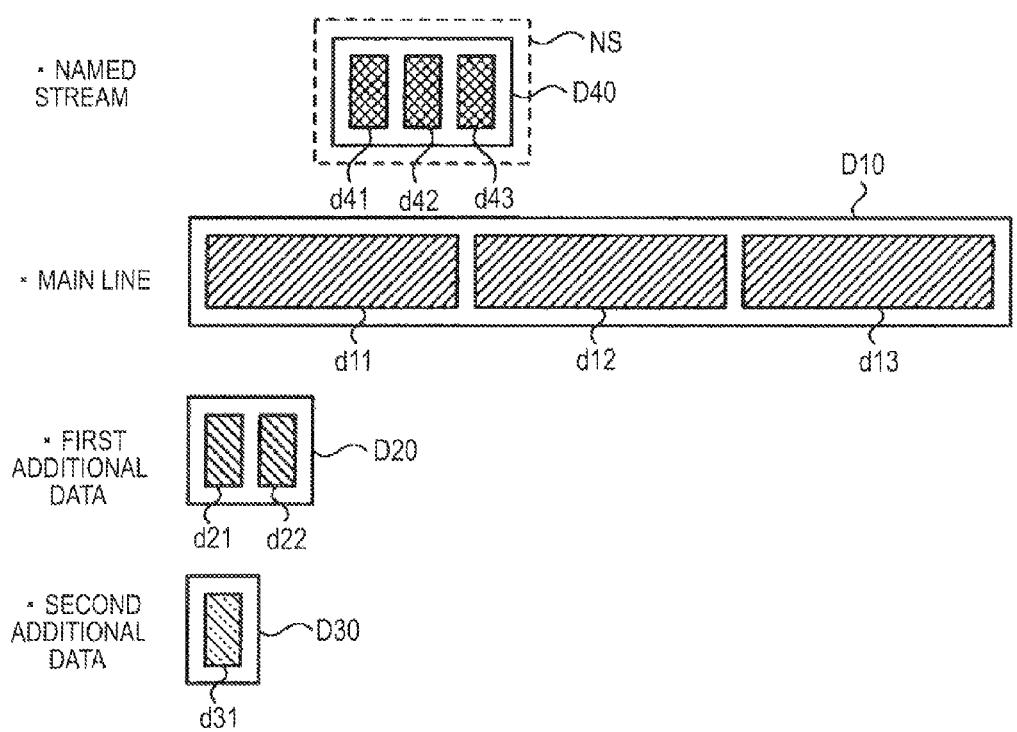
FIG. 15 is an explanatory diagram showing an example of a data recording state (management information after a video recording end process) according to the embodiment of the present disclosure.

That is, as shown in FIG. 15, through the update of the management information, the writing history information D40 is registered as information of a named stream NS, and the writing history information D40 is left in the recording medium 37 even after the recording stop process. The writing history information D40 shown in FIG. 15 shows the writing history information D40 in FIG. 14B as is. However, actually, by executing the writing, data of writing history information is added to writing history information files. In addition, the writing history information files immediately before the recording stop process are registered as information of the named stream NS.

Figure 16:
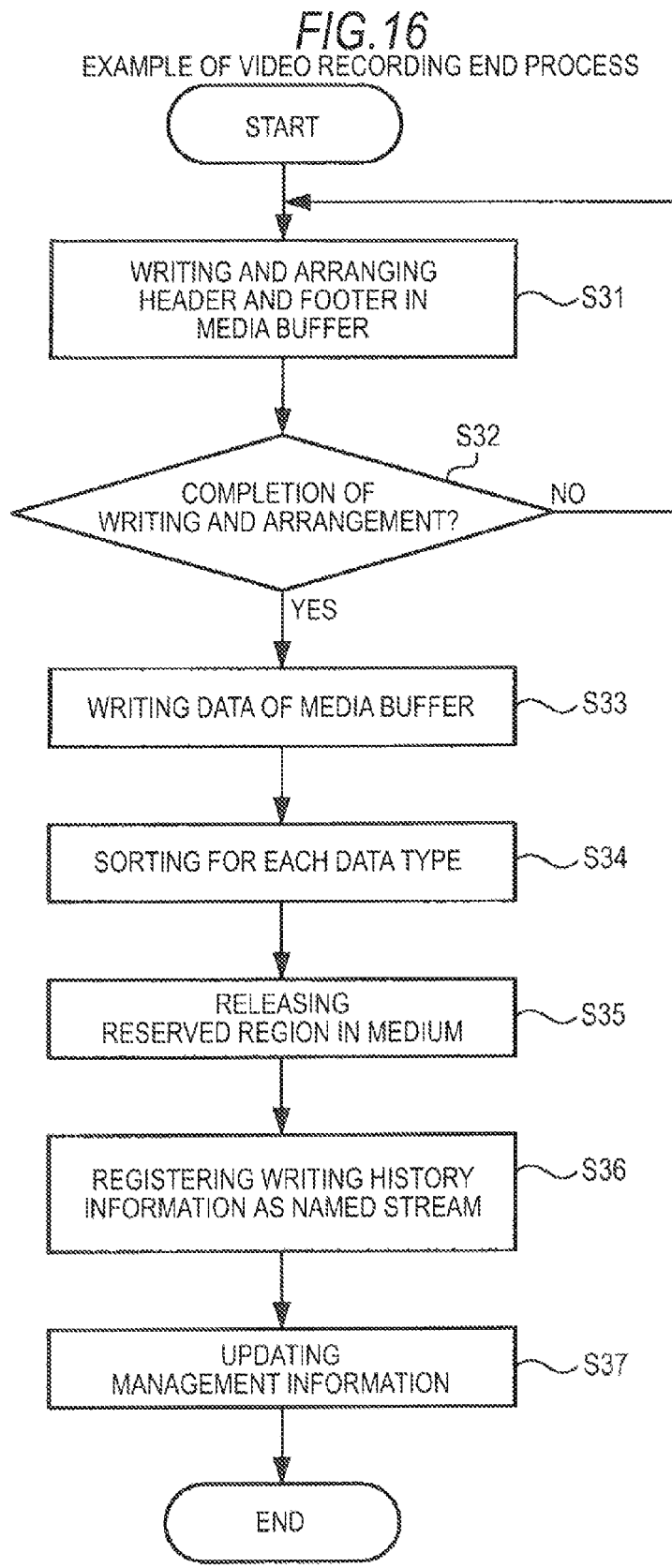
FIG. 16 is a flowchart showing an example of a video recording end process when the process is performed according to the embodiment of the present disclosure.

FIG. 16 is a flowchart showing an example of a process when ending the video recording (recording) of the video data to the recording medium 37.

When giving a description in accordance with FIG. 16, first, due to a recording stop operation such as a video recording end operation in the imaging device 1, a process of stopping the recording to the recording medium 37 is started. When this recording stop process is started, a header and a footer with regard to recorded video data are generated, and a process of writing data of the generated header and footer to the media buffer and a process of arranging the written data are executed (Step S31). In addition, it is determined whether or not the process of writing the data of the header and footer to the media buffer and the arrangement process have ended (Step S32), and the process of Step S31 is repeated until the end of the processes.

When the process of writing to the media buffer and the arrangement process end, the writing of the data in the media buffer to the recording medium is executed (Step S31). Thereafter, sorting for each data type is performed (Step S32), and a process of releasing the reserved region in the medium is performed (Step S33).

Next, the writing history information files recorded in the recording medium are registered as information of a named stream (Step S34) to be in the management state shown in FIG. 15. Through the registration as the information of the named stream, the writing history information files existing before the registration are deleted from the real recorded file.

In addition, the management information is updated correspondingly thereto (Step S35) and the recording stop process ends.

As show in this flowchart of FIG. 16, through the recording stop process, all the writing history information files before the recording stop process are registered as the information of the named stream, and the writing history information becomes data hidden from a normal user's point of view.

As described above, according to the imaging device of this embodiment, for each unit of writing to the recording medium, writing history information functioning as writing completion information is generated and added at the end. Accordingly, in the reproduction, the reliability of one unit of writing data is secured from the writing history information. Even when the update of the management information with regard to the recording data is delayed and the recording data is not able to be confirmed from the management information, it is possible to rescue the recording data from the writing history information.

In greater detail, for example, even when the recording is interrupted for some reason during the process of writing video data in the recording medium, it is possible to perform the reproduction up to the data written to the end and a preferable reproduction process can be performed.

In addition, by registering the management data including the writing history information which is used as writing completion information as a named stream which is additional information prepared by the file system, the writing history information becomes data hidden from a normal user's point of view. Accordingly, a normal user is not able to access the writing history information and the like. For example, even when a user displays a list of recorded files by using a file system, files of the management data are not displayed. Accordingly, the writing history information appropriately functions for management without being deleted by a file operation of a user, and it is possible to prevent troubles due to the deletion of a relatively small capacity of management data in the recording stop process.

The file or data which is registered as a named stream tends to be deleted together when an original file related to the named stream is deleted. Accordingly, by deleting the original file, the recording region of the file or data of the named stream is also released and the recording region can be opened at an appropriate timing.

In addition, according to the imaging device of this embodiment, since a storage region in the semiconductor memory in the recording medium is reserved in advance and then data is recorded in the reserved region by a predetermined amount, it is possible to rapidly and efficiently perform recording. When the remaining amount of the reserved region is less than a certain amount, a process of increasing the reserved region is appropriately performed.

In addition, the reservation process is performed only by the update of the management data in the recording medium. The reservation process can be rapidly performed since no data is written in the reserved region.

Furthermore, the management data update process for reservation is performed simultaneously with the update of the management data in the recording of the data in the recording medium, and thus it is possible to efficiently perform the process without performing an unnecessary writing process for update of the management data.

In addition, according to the imaging device of this embodiment, video data which is generated by imaging, audio data and additional data thereof are written in the memory card in order of generation (input) in the buffer to be in a mixing state of data in file constitution units. Accordingly, in the writing, the data delay between the recording device (imaging device) and the recording medium is suppressed, and data is written in the recording medium for each recording unit. Therefore, even when unexpected interruption such as power discontinuity occurs during the writing, data which is unrecorded in the recording medium is suppressed to be minimum, and when some trouble occurs, the loss of the data during the imaging and recording in the recording medium can be minimized.

In addition, after writing in the recording medium, the management data is updated, and thus the data is handled as continuous data for each type in the file management. Accordingly, in the reproduction, excellent and rapid reproduction using the management data can be performed.

In addition, when data is transferred to the recording medium 37 from the media buffer 58 and then recorded, writing history information is added for each unit of data. Accordingly, from the writing history information, the additional data with regard to the recorded video data or audio data can be restored. That is, since first additional data and second additional data less than a file constitution unit are added to the recording history information, the additional data can be restored even when the recording operation is interrupted while the first additional data and the second additional data are not recorded as original data in the recording medium.

8. Modified Examples

In the above-described embodiments, the configuration and the operations of the recording device incorporated in the imaging and recording device which is a video camera performing recording have been described. However, the present disclosure can also be applied to other various recording devices. That is, the same recording may be applied to a recording device other than the imaging device which records video data and audio data in a recording medium. Otherwise, the present disclosure can also be applied to a recording device which records main data other than video data and audio data and additional data of the main data at the same time. In addition, the present disclosure can also be applied when only video data and audio data which are main data are recorded.

In addition, in the specific data arrangement states shown in FIGS. 6A to 14B, data arrangement, which shows the principle of the embodiment and is different from the arrangement shown in the drawing, may be provided.

In addition, other than the case in which the process according to the embodiment of the present disclosure is performed in dedicated recording devices for respective purposes such as the imaging device 1 shown in FIG. 1, for example, the present disclosure may also be applied to an information processing device (system) which is constituted of a personal computer device and peripheral equipment thereof. That is, a program (software) may be installed and executed in a personal computer device to perform the process according to the embodiment of the present disclosure so as to record the data in a recording medium or the like in the same manner on the computer device.

In addition, the above-described data structure of the recording data such as writing history information is an example, and the recording data may have another configuration. An appropriate example of the data arrangement is also shown, and another data arrangement may be provided.

Furthermore, in the above-described embodiments, the management data such as the writing history information is registered as the region of a named stream which is additional information prepared in the file system. However, it may be registered as another additional information prepared in the file system. For example, registration as additional information referred to as another name such as a stream with name, an alternate data stream, or a fork, which is hidden from a normal user's point of view, tends to be deleted together with the related original file, and has the same function is also possible.

In addition, in the above-described embodiments, as an example of the registration as a named stream (or alternate data stream, fork), writing history information is used as an example, and the writing history information is not shown from a user. However, a part of the other recorded data or some recorded files, which may not be visible by a user, may be registered as a named stream (or alternate data stream, fork).

In addition, in the above-described embodiments, up to the registration as a named stream has been described. However, a function of registration as a file may be realized instead of the named stream (or the alternate data stream, the fork). In that case, this operation can be used to restore the data and acquire the region.

The present disclosure contains subject matter related to that disclosed in Japanese Priority Patent Application JP 2010-224216 filed in the Japan Patent Office on Oct. 1, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device comprising:
an input portion to which main data and additional data for locating said main data are input;
a buffer which accumulates said main and additional data; and
a recording control portion which transfers the main data and additional data accumulated in the buffer to a recording medium to record the data in the recording medium by using a certain file system, said main data being recorded in writing units, each of predetermined length formed of a predetermined number of file arrangement units and said additional data being recorded in a number of file arrangement units less than said predetermined number, wherein said recording control portion specifies a partial region to which additional information is recorded, said partial region being in the recording medium or in files recorded on the recording medium, and said additional information having been prepared in the file system and including said additional data and writing history information representing completion of recording of writing units;
said recording control portion including a file system control portion to reserve for recording on said recording medium recording regions having a recording capacity sufficient to record an integer multiple of said writing units;

said recording control portion transfers data to said recording medium when a writing unit of data is accumulated in the buffer;

wherein said additional information, when recorded in said partial region cannot be accessed or deleted in the absence of a particular interface associated with said certain file system.

2. The recording device according to claim 1, wherein said additional information is recorded in the partial region in a recording end process.

3. The recording device according to claim 1, wherein the additional information prepared in the file system and recorded in the partial region is not visible by a user through a normal operation when a file recorded in the recording medium is opened by using the file system.

4. The recording device according to claim 1, wherein the writing history information is writing history information of video data.

5. An imaging and recording device comprising:

an imaging portion which performs imaging to obtain video data; and a recording control portion which uses a certain file system to transfer the video data obtained by the imaging portion to a recording medium to record the video data to the recording medium in writing units, each of predetermined length formed of a predetermined number of file arrangement units, wherein said recording control portion includes a buffer which accumulates the video data and additional information, the recording control portion specifies a partial region to which the additional information is recorded, said partial region being in the recording medium or in a file which is recorded simultaneously on the recording medium with the recording of the video data, said additional information being recorded in a number of file arrangement units less than said predetermined number and having been prepared in the file system and including additional data adapted to locate said main data and writing history information representing completion of recording of writing units, said recording control portion using the file system to reserve for recording on said recording medium recording regions having a recording capacity sufficient to record an integer multiple of said writing units;

said recording control portion transfers data to said recording medium when a writing unit of data is accumulated in the buffer;

wherein said additional information, when recorded in said partial region cannot be accessed or deleted in the absence of a particular interface associated with said certain file system.

6. The imaging and recording device according to claim 5, wherein said additional information is recorded in the partial region in a process of ending the video data recording to the recording medium.

7. The imaging and recording device according to claim 5, wherein the additional information prepared in the file system and recorded in the partial region is not visible by a user through a normal operation when a file recorded in the recording medium is opened by using the file system.

8. A recording method comprising:

accumulating main and additional data in a buffer;

recording the accumulated main data and additional data, the additional data locating said main data in a recording medium by using a certain file system, said additional data being prepared by said file system, the data being recorded in writing units, each of predetermined length formed of a predetermined number of file arrangement units and the additional data being recorded in a number of file arrangement units less than said predetermined number; and performing management in which a partial region is specified to which additional information is recorded, said additional information including writing history information representing completion of recording of writing units, said partial region being in the recording medium or in files recorded on the recording medium and setting as an additional information region the specified partial region, said management reserving recording regions on the recording medium having a recording capacity sufficient to record an integer multiple of said writing units, and the data being recorded on a recording medium when a writing unit of data is accumulated;

wherein said additional information, when recorded in said partial region cannot be accessed or deleted in the absence of a particular interface associated with said certain file system.

9. A non-transitory computer-readable storage medium that stores a program which, when executed by an information processor performs the method comprising:

accumulating main and additional data in a buffer;

recording the accumulated main data and additional data, the additional data locating said main data in a recording medium by using a certain file system, said additional data being prepared by said file system, the data being recorded in writing units, each of predetermined length formed of a predetermined number of file arrangement units and the additional data being recorded in a number of file arrangement units less than said predetermined number; and performing management in which a partial region is specified to which additional information is recorded, said additional information including writing history information representing completion of recording of writing units, said partial region being in the recording medium or in files recorded on the recording medium and setting as an additional information region the specified partial region, said management reserving recording regions on the recording medium having a recording capacity sufficient to record an integer multiple of said writing units, and the data being recorded on a recording medium when a writing unit of data is accumulated;

wherein said additional information, when recorded in said partial region cannot be accessed or deleted in the absence of a particular interface associated with said certain file system.

* * * * *